US011225055B2

(12) United States Patent
Shimazaki et al.

(10) Patent No.: US 11,225,055 B2
(45) Date of Patent: Jan. 18, 2022

(54) INDUSTRIAL ROLL AND METHOD FOR MANUFACTURING THE SAME

(71) Applicant: YAMAUCHI CORPORATION, Osaka (JP)

(72) Inventors: Hiroya Shimazaki, Osaka (JP); Yoshiaki Tokunaga, Fukuoka (JP); Tatsuyuki Abe, Osaka (JP)

(73) Assignee: Yamauchi Corporation, Osaka (JP)

(*) Notice: Subject to any disclaimer, the term of this patent is extended or adjusted under 35 U.S.C. 154(b) by 353 days.

(21) Appl. No.: 15/510,907

(22) PCT Filed: Sep. 17, 2015

(86) PCT No.: PCT/JP2015/076566
§ 371 (c)(1),
(2) Date: Mar. 13, 2017

(87) PCT Pub. No.: WO2016/043290
PCT Pub. Date: Mar. 24, 2016

(65) Prior Publication Data
US 2017/0274625 A1    Sep. 28, 2017

(30) Foreign Application Priority Data

Sep. 19, 2014   (JP) .............................. JP2014-190837

(51) Int. Cl.
*B32B 15/092*   (2006.01)
*B32B 15/08*    (2006.01)
(Continued)

(52) U.S. Cl.
CPC .............. *B32B 15/092* (2013.01); *B32B 7/12* (2013.01); *B32B 15/08* (2013.01); *B32B 37/12* (2013.01);
(Continued)

(58) Field of Classification Search
None
See application file for complete search history.

(56) References Cited

U.S. PATENT DOCUMENTS 3,617,445 A * 11/1971 Brafford .................. D21F 3/08
162/358.1
4,551,894 A    11/1985 Beucker
(Continued)

FOREIGN PATENT DOCUMENTS

CN    1781623 A    6/2006
CN    203325959 U   12/2013
(Continued)

OTHER PUBLICATIONS

Kuroda et al., Machine translation of JP2008250257, 2008, retrieved from patents.google.com (Year: 2008).*
(Continued)

*Primary Examiner* — Callie E Shosho
*Assistant Examiner* — John Vincent Lawler
(74) *Attorney, Agent, or Firm* — Ditthavong, Steiner & Mlotkowski

(57) ABSTRACT

The industrial roll according to the invention includes a core member made of a metal, a first adhesive layer formed in contact with an outer surface of the core member, a second adhesive layer formed on an outer surface side of the first adhesive layer, and a cover member formed in contact with an outer surface of the second adhesive layer and made of an elastic material. The first adhesive layer is made of a material with better adhesive properties to the core member than to the cover member, and the second adhesive layer is made of a material with better adhesive properties to the cover member than to the core member.

6 Claims, 3 Drawing Sheets

(51) Int. Cl.
*F16C 13/00* (2006.01)
*D21F 3/08* (2006.01)
*D21G 1/02* (2006.01)
*B32B 7/12* (2006.01)
*B32B 37/12* (2006.01)
*D21F 1/40* (2006.01)

(52) U.S. Cl.
CPC ............... *D21F 1/40* (2013.01); *D21F 3/08* (2013.01); *D21G 1/02* (2013.01); *D21G 1/0233* (2013.01); *F16C 13/00* (2013.01)

(56) References Cited

U.S. PATENT DOCUMENTS

| | | | |
|---|---|---|---|
| 4,571,798 A | 2/1986 | Adams | |
| 6,874,232 B2* | 4/2005 | Madden | B29C 53/581 29/895.211 |
| 7,090,747 B2* | 8/2006 | Watanabe | C08G 18/10 162/306 |
| 2004/0162202 A1* | 8/2004 | Shieh | D21G 1/0233 492/35 |
| 2005/0001353 A1* | 1/2005 | Nakayama | B29C 65/4835 264/262 |
| 2007/0111871 A1* | 5/2007 | Butterfield | D21F 3/08 492/53 |
| 2008/0200320 A1* | 8/2008 | Buckner | B31F 1/07 492/48 |
| 2010/0252217 A1* | 10/2010 | Eberhardt | D21F 1/0027 162/289 |
| 2010/0282909 A1* | 11/2010 | Rawlings | B32B 15/06 244/130 |
| 2015/0132581 A1* | 5/2015 | Li | C09J 163/04 428/415 |

FOREIGN PATENT DOCUMENTS

| | | |
|---|---|---|
| EP | 1 783 270 A1 | 5/2007 |
| JP | S446074 B | 3/1969 |
| JP | S4819814 B | 6/1973 |
| JP | S57118898 A | 7/1982 |
| JP | S5936133 B2 | 9/1984 |
| JP | H01172612 A | 7/1989 |
| JP | 2007186839 A | 7/2007 |
| JP | 2008250257 A | 10/2008 |
| JP | 2009080316 A | 4/2009 |
| JP | 2012189748 A | 10/2012 |
| JP | 2013144497 A | 7/2013 |

OTHER PUBLICATIONS

Miura, Machine translation of JP2012189748, 2012, retrieved from patents.google.com (Year: 2012).*
Ebnesajjad—Adhesives for Special Adherends—Hand.Adv.& Surf. Prep—2011 (Year: 2011).*
Extended European Search Report for related European Patent Application No. 15871433.4-1018, dated Apr. 19, 2018, 7 pages.

* cited by examiner

INDUSTRIAL ROLL AND METHOD FOR MANUFACTURING THE SAME

RELATED APPLICATIONS

The present application is a national stage entry of PCT/JP2015/076566, filed on Sep. 17, 2015, which claims priority to Japanese Patent Application Serial No. 2014-190837, filed Sep. 19, 2014, which are incorporated herein by reference by their entirety.

TECHNICAL FIELD

This invention relates to industrial rolls used in the papermaking industry and other industries, and methods for manufacturing the industrial rolls. More specifically, the industrial roll (hereinafter, sometimes referred to as simply "roll") according to the invention is suitably used as a papermaking roll, a papermaking calender roll, and a textile calender roll.

BACKGROUND ART

Conventionally, industrial rolls used in the papermaking industry and other industries include a core member, and a cover member formed over the core member (e.g., Patent Literature (PTL) 1 to 4).

PTL 1 discloses a rubber roll including an iron core as a core member, a urethane rubber as a cover member, and an adhesive that bonds the iron core and urethane rubber. PTL 2 to PTL 5 point out a problem of using adhesives as described in PTL 1, because adhesives have relatively low strength to hold the core member and cover member together, and therefore may make the cover member prone to removal from the core member. To solve the problem, the disclosures of PTL 2 to PTL 5 suggest to form a base layer containing resin or FRP between the core member and cover member.

CITATION LIST

Patent Literature

PTL 1: Japanese Examined Patent Publication No. S44 (1969)-6074
PTL 2: Japanese Examined Patent Publication No. S48 (1973)-19814
PTL 3: Japanese Examined Patent Publication No. S59 (1984)-36133
PTL 4: Japanese Examined Patent Publication No. H2(1990)-60793
PTL 5: Japanese Unexamined Patent Publication No. H1(1989)-172612

SUMMARY OF INVENTION

Technical Problem

The rolls disclosed in PTL 2 to PTL 5 have a base layer. Formation of the base layer requires an expensive reinforcing member. If the base layer is formed by winding or the like, the base layer needs to undergo a curing process and a griding process prior to placement of a cover member. As a result, formation of a base layer increases the number of manufacturing processes and the costs. In addition, industrial roll surfaces that wear out from use over a period of time can be reused after surface griding; however, the conventional industrial rolls having a base layer of about 1 to 15 mm in thickness can not have a thick cover member accordingly, and therefore the number of times the surface can be ground is limited. To solve the problem, the inventors of the present invention diligently researched to find a technique to maintain high bond strength between the core member and cover member without using the base layer. The present invention has been made to provide a structurally-simple industrial roll having a core member and a cover member bonded with high bond strength, and a method for manufacturing the industrial roll.

Solution to Problem

The inventors of the present invention have found that the base layer can be replaced with an adhesive with high bond strength to the core member, and an adhesive with high bond strength to the cover member in order to maintain high bond strength between the core member and cover member without using the base layer. In this description, the base layer includes not only a layer made of resin or FRP formed between the core member and cover member, but also a reinforcing member, such as threads, woven fabric, and nonwoven fabric, that is buried in the cover member, close to the core member, and is structurally distinctive from an outer surface area of the core member.

Specifically, the industrial roll according to the present invention includes a core member made of a metal, a first adhesive layer formed in contact with an outer surface of the core member, a second adhesive layer formed on an outer surface side of the first adhesive layer, and a cover member formed in contact with an outer surface of the second adhesive layer and made of an elastic material. The first adhesive layer is made of a material with better adhesion properties to the core member than to the cover member, and the second adhesive layer is made of a material with better adhesion properties to the cover member than to the core member.

The method for manufacturing the industrial roll according to the present invention includes a step of preparing a core member made of a metal, a step of forming a first adhesive layer in contact with an outer surface of the core member, a step of forming a second adhesive layer on an outer surface side of the first adhesive layer, and a step of forming a cover member in contact with an outer surface of the second adhesive layer, the cover member being made of an elastic material. The first adhesive layer is made of a material with better adhesion properties to the core member than to the cover member, and the second adhesive layer is made of a material with better adhesion properties to the cover member than to the core member.

According to the industrial roll and the manufacturing method of the present invention, the first adhesive layer, which is made of a material with better adhesion properties to the core member than to the cover member, is formed in contact with the core member, while the second adhesive layer, which is made of a material with better adhesion properties to the elastic material than to the core member, is formed in contact with the cover member. The first adhesive having high bond strength to the core member and the second adhesive having high bond strength to the cover member can bond the core member and cover member with high bond strength. The high bond strength between the core member and cover member can be maintained without forming the base layer between the core member and cover member, and therefore, the present invention can achieve an industrial roll that is structurally simple and has high bond strength between the core member and cover member.

The cover member of the industrial roll according to the invention is preferably selected from the group consisting of polyurethane resin, epoxy resin, polyurea resin, and synthetic rubber. The polyurethane resin, epoxy resin, polyurea resin, and synthetic rubber are suitable materials for the cover member.

The core member of the industrial roll according to the invention is preferably iron or an alloy of iron, and the first adhesive layer is a phenol-based adhesive and/or an epoxy-based adhesive.

The use of the phenol-based adhesive and/or epoxy-based adhesive, which has good adhesion properties to iron or an alloy of iron, for the first adhesive layer enhances the bond strength between the core member and first adhesive layer, thereby improving the bond strength between the core member and cover member.

The cover member of the industrial roll according to the invention is preferably polyurethane resin, and the second adhesive layer is preferably a urethane-based adhesive.

The use of the urethane-based adhesive, which has good adhesion properties to polyurethane resin of the cover member, for the second adhesive layer enhances the bond strength between the cover member and second adhesive layer, thereby improving the bond strength between the core member and cover member.

The cover member of the industrial roll according to the invention is preferably epoxy resin, and the second adhesive layer is preferably an epoxy-based adhesive.

The use of the epoxy-based adhesive, which has good adhesion properties to the epoxy resin of the cover member, for the second adhesive layer enhances the bond strength between the cover member and second adhesive layer, thereby improving the bond strength between the core member and cover member.

The cover member of the industrial roll according to the invention is preferably polyurea resin, and the second adhesive layer is preferably an epoxy-based adhesive.

The use of the epoxy-based adhesive, which has good adhesion properties to the polyurea resin of the cover member, for the second adhesive layer enhances the bond strength between the cover member and second adhesive layer, thereby improving the bond strength between the core member and cover member.

The cover member of the industrial roll according to the invention is preferably synthetic rubber, and the second adhesive layer is preferably a rubber-based adhesive.

The use of the rubber-based adhesive, which has good adhesion properties to the synthetic rubber of the cover member, for the second adhesive layer enhances the bond strength between the cover member and second adhesive layer, thereby improving the bond strength between the core member and cover member.

The first adhesive layer of the industrial roll according to the invention is preferably subjected to a baking process.

In the method for manufacturing the industrial roll according to the invention, the step of forming the first adhesive layer in contact with the outer surface of the core member includes the baking process on the first adhesive layer prior to the step of forming the second adhesive layer in contact with the outer surface of the first adhesive layer.

Since the second adhesive layer is to be formed after the first adhesive layer is baked, the first adhesive layer can complete its reaction before the second adhesive layer is formed. This can prevent the first adhesive layer from being mixed with the second adhesive layer. Thus, the bond strength between the first and second adhesive layers can be maintained, thereby improving the bond strength between the core member and cover member.

Advantageous Effects of Invention

The present invention can provide a structurally-simple industrial roll having a core member and a cover member bonded with high bond strength.

DESCRIPTION OF EMBODIMENT

Figure 1:
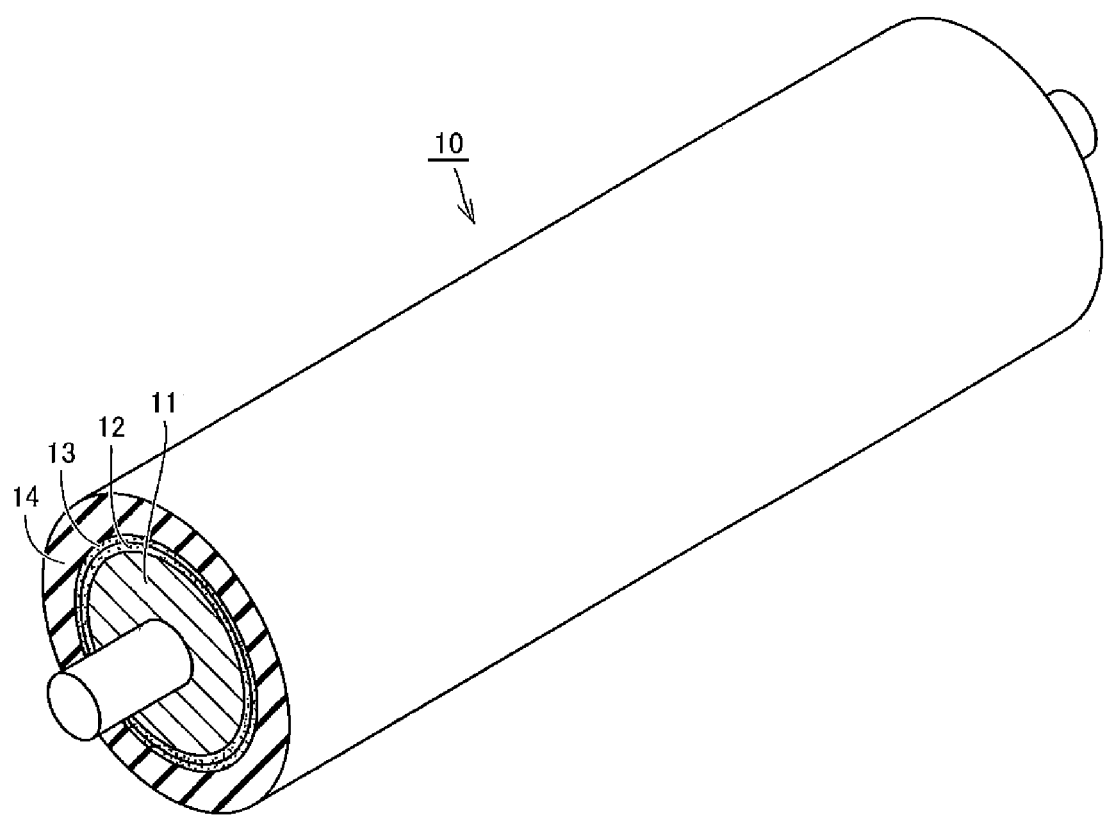
FIG. 1 is a perspective view schematically showing an industrial roll according to an embodiment of the present invention.

With reference to the accompanying drawings, an embodiment of the present invention will be described below. The same or similar components are denoted by the same reference symbols or reference numerals throughout the drawings, and the description thereof will not be reiterated.

Referring to FIG. 1, a roll 10 according to the embodiment of the present invention will be described. The roll 10 of the embodiment includes a core member 11, a first adhesive layer 12, a second adhesive layer 13, and a cover member 14. The core member 11, first adhesive layer 12, second adhesive layer 13, and cover member 14 are arranged in this order from the inside of the roll 10.

The core member 11 is made of a metal, preferably contains iron, and more preferably is iron or an alloy of iron.

Provided in contact with an outer surface of the core member 11 is the first adhesive layer 12. The first adhesive layer 12 is made of a material that exhibits better adhesion properties to the core member 11 than to the cover member 14. In short, the first adhesive layer 12 is made of a material that is compatible with the core member 11. The material exhibiting good adhesion properties to the core member 11 is a material with high bond strength to the core member 11, and includes, for example, a phenol-based adhesive, epoxy-based adhesive, second generation acrylic-based adhesive, urea-based adhesive, polyimide-based adhesive, melamine resin-based adhesive, acrylic-based adhesive, cyanoacrylate-based adhesive, etc. If the core member 11 is iron or an alloy of iron, the first adhesive layer 12 is preferably a phenol-based adhesive and/or an epoxy-based adhesive.

It is preferable that the first adhesive layer 12 is subjected to a baking process. In other words, the first adhesive layer 12 is cured before the second adhesive layer 13 is formed.

Provided in contact with an outer surface of the first adhesive layer 12 is the second adhesive layer 13. The second adhesive layer 13 is made of a material that exhibits better adhesion properties to the cover member 14 than to the core member 11. In short, the second adhesive layer 13 is made of a material that is compatible with the cover member 14. The material exhibiting good adhesion properties to the cover member 14 is a material with high bond strength to the cover member 14, and includes, for example, a urethane-based adhesive, epoxy-based adhesive, chloroprene rubber-based adhesive, nitrile rubber-based adhesive, styrene-butadiene rubber-based adhesive, vinyl resin-based adhesive, polyester-based adhesive, polyvinyl butyral-based adhesive, silicone-based adhesive, modified silicone-based adhesive, etc. If the cover member 14 is polyurethane resin, the second adhesive layer 13 is preferably a urethane-based adhesive. If the cover member 14 is epoxy resin or polyurea resin, the second adhesive layer 13 is preferably an epoxy-based adhesive. If the cover member 14 is synthetic rubber, the second adhesive layer 13 is preferably a rubber-based adhesive. The preferable material for the second adhesive layer 13 is one that exhibits good adhesion properties to (good compatibility with) the first adhesive layer 12.

The second adhesive layer 13 can be formed anywhere, but has to be on the outer surface side of the first adhesive layer 12. This means that a single or a plurality of adhesive layers, which are made of a different material from those of the first adhesive layer 12 and the second adhesive layer 13, may be provided between the first adhesive layer 12 and the second adhesive layer 13.

Provided in contact with an outer surface of the second adhesive layer 13 is the cover member 14. The cover member 14 is made of an elastic material, such as urethane resin, epoxy resin, polyurea resin, and synthetic rubber.

Synthetic rubber for the cover member 14 includes styrene-butadiene rubber (SBR), nitrile rubber (NBR), and so on.

Figure 2:
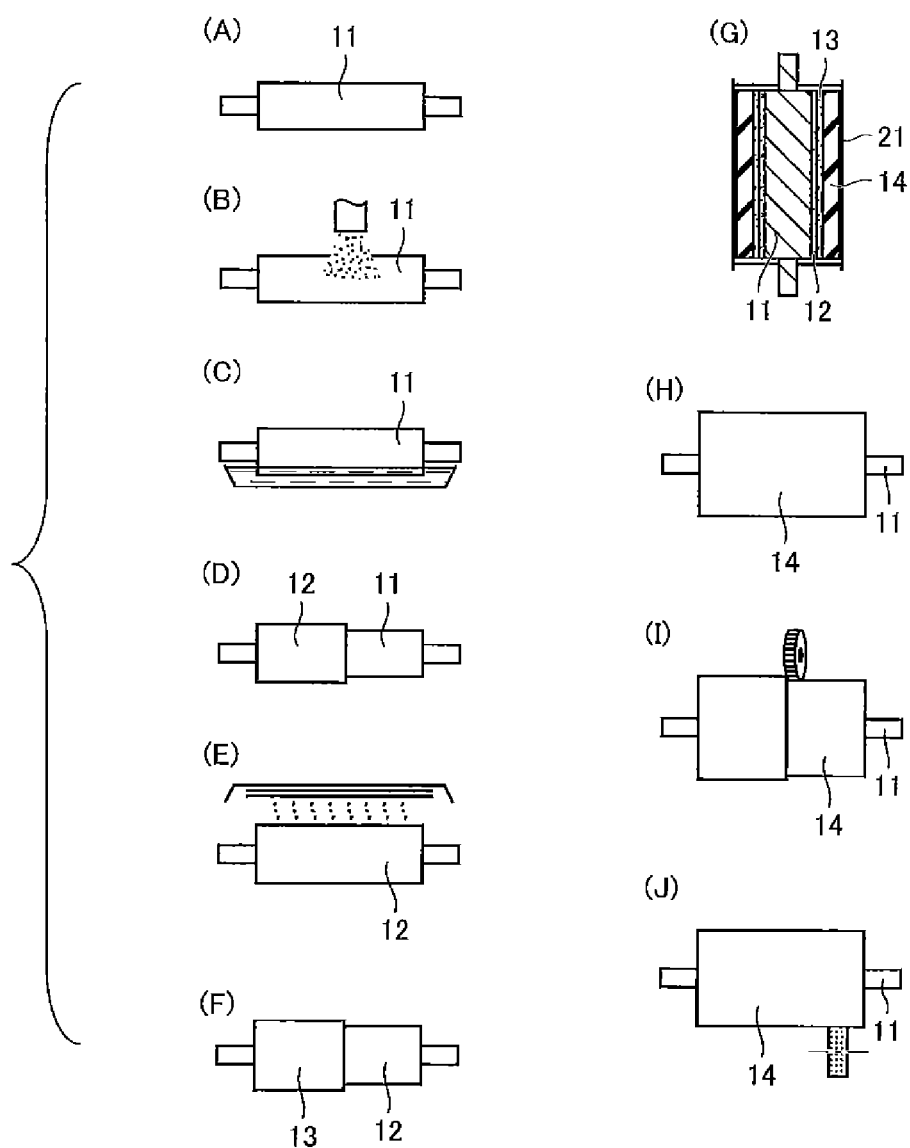
FIG. 2 is a schematic view showing a method for manufacturing the industrial roll according to the embodiment of the invention.

Referring now to FIGS. 1 and 2, a method for manufacturing the roll 10 of the embodiment will be described.

First, as shown in FIG. 2(A), a metallic core member 11 is prepared. The core member prepared in this step may be an unused core member or a core member obtained by removing all other components from a used roll. The core member 11 is iron or an alloy of iron.

Second, as shown in FIG. 2(B), the core member 11 is subjected to a blasting process. In this step, abrasive particles are blasted against a surface of the core member 11 to apply surface treatment to the core member 11. The surface roughening treatment increases the contact area of the surface with the first adhesive layer 12. Subsequently, as shown in FIG. 2(C), the surface of the core member 11 is washed.

FIG. 2(D) shows that the first adhesive layer 12, which is made of a material with good adhesion properties to the core member 11, is formed in contact with an outer surface of the core member 11. In this step, for example, the first adhesive layer 12 is applied on the surface of the core member 11. If the core member 11 is iron or an alloy of iron, a phenol-based adhesive and/or epoxy-based adhesive is preferable to be formed as the first adhesive layer 12 on the surface of the core member 11.

FIG. 2(E) shows that the first adhesive layer 12 is subjected to a baking process prior to the next step in which the second adhesive layer 13 is formed in contact with the outer surface of the first adhesive layer 12. In this step, the first adhesive layer 12 is cured by heating it at a curing temperature or higher. Since the first adhesive, which makes up the first adhesive layer 12, is cured in this step, the components of the first adhesive layer 12 can be prevented from being mixed with the components of the second adhesive layer 13 that is to be formed in contact with the first adhesive layer 12 in the subsequent step.

FIG. 2(F) shows that the second adhesive layer 13, which is made of a material with good adhesion properties to the cover member 14, is formed in contact with the outer surface of the first adhesive layer 12. In this step, for example, the second adhesive layer 13 is applied on the surface of the first adhesive layer 12. If the cover member 14 is polyurethane resin, it is preferable to form a urethane-based adhesive as the second adhesive layer 13 on the surface of the first adhesive layer 12, while if the cover member 14 is epoxy resin or polyurea resin, it is preferable to form an epoxy-based adhesive as the second adhesive layer 13 on the surface of the first adhesive layer 12.

FIG. 2(G) shows that the cover member 14, which is made of an elastic material, is formed in contact with an outer surface of the second adhesive layer 13. The method for forming the cover member 14 is not particularly limited, but, for example, the cover member 14 is formed by casting. Specifically, as shown in FIG. 2(G), the core member 11 with the first and second adhesive layers 12, 13 formed thereon is placed at the center of a hollow cylindrical mold 21, then an elastic material prepared for casting is poured in between the mold 21 and the second adhesive layer 13, and all the components are taken out from the mold 21. The elastic material for casting is, for example, polyurethane elastomer, epoxy resin, polyurea resin, and so on.

In this step, the following methods can be used to form the cover member 14 instead of casting. For example, a tubular cover member 14 is formed in a separate step, and is put over a core member 11 with the first and second adhesive layers 12, 13 formed thereon. Then, an adhesive made of the same material as that of the cover member 14 or the second adhesive layer 13 is poured in between the tubular cover member 14 and the second adhesive layer 13 to bond them.

Alternatively, a third adhesive layer is formed on the first adhesive layer 12 that is formed on the outer surface of the core member 11. Then, a tubular cover member 14, which has been formed in a separate step, is put over the core member 11 with the first and third adhesive layers formed thereon, and a second adhesive layer 13 is poured in between the tubular cover member 14 and the third adhesive layer to bond them.

Also, in this step, the separately-formed tubular cover member 14 may be put over a core member 11 with a first adhesive layer 12 formed thereon, and an adhesive made of a material to be a second adhesive layer is poured in between the tubular cover member 14 and the first adhesive layer 12 to bond them.

If the cover member 14 is synthetic rubber, this step may be done as follows; a core member 11 with a first adhesive layer 12 formed thereon is prepared, and a second adhesive layer 13 that is a rubber-based adhesive, such as a nitrile rubber-based adhesive, is formed on an outer surface of the first adhesive layer 12. Then, unvulcanized rubber, such as NBR, is applied to cover the surface of the second adhesive layer 13, and subsequently is vulcanized. In other words, a first adhesive layer 12 is provided on a surface of the core member 11, then, a second adhesive layer 13 is provided on an outer surface of the first adhesive layer 12, an unvulcanized rubber is applied on an outer surface of the second adhesive layer 13, and the rubber is vulcanized.

Furthermore, the step of forming a cover member 14 can be achieved not by casting, but by winding woven fabric, nonwoven fabric, or other kinds of fabric impregnated with thermosetting resin around a core member 11 with first and second adhesive layers 12, 13 formed thereon.

FIG. 2(H) shows that the cover member 14 and the second adhesive layer 13 are cured by heating them at the curing temperature or higher. Since the first and second adhesive layers 12, 13 and cover member 14 can be cured in the step shown in FIG. 2(H), the step of baking the first adhesive layer 12 in FIG. 2(E) can be omitted.

FIG. 2(I) shows a rough cutting step to properly shape the roll, and the roll is ground as shown in FIG. 2(J).

The above-described steps are performed to manufacture the roll 10, as shown in FIG. 1, including the core member 11, the first adhesive layer 12 formed in contact with the core member 11, the second adhesive layer 13 formed in contact with the first adhesive layer 12, and the cover member 14 formed in contact with the second adhesive layer 13, forming a base layer between the core member 11 and cover member 14. The omission of the base layer can reduce the cost of the roll 10, as well as greatly shorten the manufacturing steps. In addition, the omission of the base layer allows increasing the thickness of the cover member accordingly, thereby increasing the number of times of reuse through surface grinding, and consequently extending the useful life of the roll.

Among the industrial rolls, papermaking rolls are characteristically large in size and used at high speed. In addition, press rolls and calender rolls are used under heavy loads. The impact on the rolls when nipping paper and the heavy loads may cause delamination between the cover member and the core member, and the delamination needs to be prevented. Conventionally, a base layer is provided to prevent the delamination between the cover member and the core member. However, the industrial roll according to the present invention can ensure sufficient bond strength between the core member and cover member without using the base layer.

The industrial roll according to the present invention can be used especially under a load of 10 kN/m or higher. In addition, the industrial roll of the invention is suitably used at a high running speed as high as 200 m/min to 2,000 m/min. Furthermore, the industrial roll of the invention is suitably used at a temperature of 40° C. to 140° C. Furthermore, the industrial roll of the invention has a diameter of 200 mm to 2,000 mm, and a length of 1 m to 15 m. The industrial roll of the invention is suitable for papermaking use, especially as a pressure roll, a size press roll, a coater backing roll, and a calender roll. If this industrial roll is a pressure roll, the pressure roll may be subjected to a process of forming holes or grooves on its surface. The press roll having subjected to the process is a suction roll or grooved roll. In addition, the industrial roll of the invention is suitably used as a textile calender roll.

EXAMPLES

More detailed description of the present invention will be given with examples, but the present invention is not limited to the examples.

[Examples: Polyurethane-Resin Cover Member]

For Examples 1, 2 and Comparative Examples 1 to 4, test rolls smaller than actual rolls were used for the purpose of comparing the bond strengths between the core member and cover member.

Example 1

Firstly, a metallic core member 11 was prepared. The core member 11 was an iron core having an outer diameter of 220 mm and a length of 300 mm.

Secondly, a first adhesive layer 12 was formed in contact with an outer surface of the core member 11. The adhesive used as the first adhesive layer 12 was "Chemlok XPJ-60" manufactured by LORD Japan, Inc. This adhesive was a phenol-based adhesive. The first adhesive layer 12 of 100 g/m² was applied on the surface of the core member 11.

Subsequently, the first adhesive layer 12 was subjected to a baking process. The first adhesive layer 12 was baked at 125° C. for 4 hours.

Next, a second adhesive layer 13 was formed in contact with an outer surface of the first adhesive layer 12. The adhesive used as the second adhesive layer 13 was "Bond KU10" manufactured by Konishi Co., Ltd. This adhesive was a urethane-based adhesive, and contained modified polyurethane, polyisocyanate, and methyl ethyl ketone in a 100:5:100 ratio. The second adhesive layer 13 of 100 g/m² was applied on the surface of the first adhesive layer 12.

Next, a cover member made of an elastic material was formed in contact with an outer surface of the second adhesive layer 13. Specifically, the core member 11 with the first and second adhesives 12, 13 formed thereon was placed at the center of a mold, and polyurethane elastomer to be the cover member 14 was cast. Used as the polyurethane elastomer was a mixture of 12.5 parts by mass of "IHARAC-UAMINE-MT" manufactured by Ihara Chemical Industry Co., Ltd. per 100 parts by mass of "HIPRENE L-100" manufactured by Mitsui Chemicals, Inc.

Subsequently, the core member 11 with the first and second adhesive layers 12, 13, and the cover layer 14 formed thereon was cured at 110° C. for 12 hours. Through the aforementioned steps, a roll of Example 1 was manufactured. The first adhesive layer 12 of the roll of Example 1 was baked before the second adhesive layer 13 was formed.

Example 2

The method for manufacturing the roll of Example 2 was basically the same as that for Example 1; however, they were different in that the first adhesive layer 12 was not subjected to a baking process prior to the step of forming the second adhesive layer 13 in contact with the outer surface of the first adhesive layer 12. In short, the first adhesive layer 12 of the roll of Example 2 was not baked before the second adhesive layer 13 was formed.

Comparative Example 1

The method for manufacturing the roll of Comparative Example 1 was basically the same as that for Example 1; however, they were different in that the steps of forming the first and second adhesive layers 12, 13 were not performed. In other words, the roll of Comparative Example 1 included a core member 11, and a cover member 14 formed in contact with the core member 11.

Comparative Example 2

The method for manufacturing the roll of Comparative Example 2 was basically the same as that for Example 1; however, they were different in that the step of forming a first adhesive was not performed. In other words, the roll of Comparative Example 2 included a core member 11, a second adhesive layer 13 formed in contact with the core member 11, and a cover member 14 formed in contact with the second adhesive layer 13.

Comparative Example 3

The method for manufacturing the roll of Comparative Example 3 was basically the same as that for Example 1; however, they were different in that the step of forming a second adhesive was not performed. In other words, the roll of Comparative Example 3 included a core member 11, a first adhesive layer 12 formed in contact with the core member 11, and a cover member 14 formed in contact with the first adhesive layer 12, and the first adhesive layer 12 was subjected to a baking process.

Comparative Example 4

The method for manufacturing the roll of Comparative Example 4 was basically the same as that for Example 2; however, they were different in that the step of forming a second adhesive was not performed. In other words, the roll of Comparative Example 4 included a core member 11, a first adhesive layer 12 formed in contact with the core member 11, and a cover member 14 formed in contact with the first adhesive layer 12, and the first adhesive layer 12 was not subjected to a baking process.
(Evaluation Method)

Figure 3:
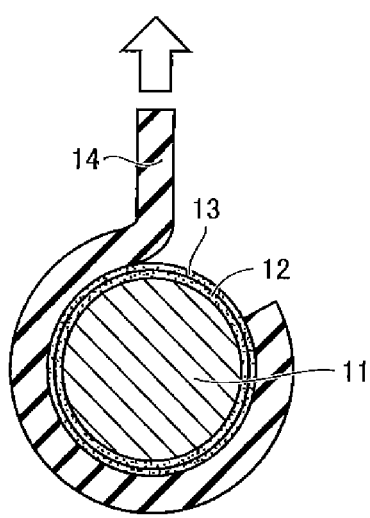
FIG. 3 is a schematic view describing a method for measuring the bond strength of examples.

The rolls of Examples 1, 2 and Comparative Examples 1 to 4 were evaluated by the following method for measuring the bond strength of the core member 11 and cover member 14. As shown in FIG. 3, the cover member 14 was cut by 10 mm in width along the longitudinal direction of the surface of the roll and 5 mm in thickness (up to the surface of the iron core), and the cut end of the cover member 14 was peeled off from the roll. The cut end was coupled to a hanging scale placed above the roll. Then the hanging scale coupled to the roll was lifted vertically upward to measure the load imposed when the cover member 14 delaminated from the core member 11. The results were denoted as "bond strength" and shown in Table 1.

TABLE 1

| | First adhesive layer | Baking | Second adhesive layer | Bond strength (N/mm) |
|---|---|---|---|---|
| Example 1 | XPJ-60 | Baked | KU10 | 13 |
| Example 2 | XPJ-60 | Not baked | KU10 | 11 |
| Comparative Example 1 | None | — | None | 5 |
| Comparative Example 2 | None | — | KU10 | 9 |
| Comparative Example 3 | XPJ-60 | Baked | None | 5 |
| Comparative Example 4 | XPJ-60 | Not baked | None | 2 |

Delamination occurred at the following areas in the aforementioned evaluation method.

Examples 1, 2: interface between the first adhesive layer and the second adhesive layer Comparative Example 1: interface between the core member and the cover member Comparative Example 2: interface between the core member and the second adhesive layer Comparative Examples 3, 4: interface between the first adhesive layer and the cover member
(Evaluation Results)

Regarding the rolls 10 of Examples 1 and 2 each including the first adhesive layer 12, which was made of a material with good adhesion properties to the core member 11, and the second adhesive layer 13, which was made of a material with good adhesion properties to the cover member 14, as shown in Table 1, the cover member 14 did not delaminate from the core member 11 under a load of less than 11 N/mm.

Especially the roll 10 of Example 1 included the first adhesive layer 12 that was baked prior to the step of forming the second adhesive layer 13 in contact with the outer surface of the first adhesive layer 12, and the cover member 14 did not delaminate from the core member 11 under a load of less than 13 N/mm, which proves that the cover member 14 has very high bond strength.

Regarding Comparative Examples 1 to 4 not including the first adhesive and/or the second adhesive, on the other hand, the cover member 14 delaminated from the core member 11 under a load of 9 N/mm or less.

Comparative Example 4 including the first adhesive layer, but not including the second adhesive layer, had bond strength less than Comparative Example 1 including neither the first nor second adhesive layers. This probably occurred because of the following reason. Comparative Example 4 had a phenol-based adhesive, which makes up the first adhesive layer, making contact with a polyurethane resin, which makes up the cover member. Since the phenolic resin is incompatible with the polyurethane resin, the first adhesive layer that has not been subjected to the baking process rather reduced its bond strength. Comparative Example 3 underwent the baking process, but still had the same bond strength as Comparative Example 1 including neither the first nor second adhesive layers, which means that the baking process performed on the first adhesive layer did not improve the bond strength. From those evaluation results, it has been understood that both of the first adhesive layer 12, which is made of a material with good adhesion properties to the core member 11, and the second adhesive layer 13, which is made of a material with good adhesion properties to the cover member 14, are necessary to achieve a simple structure without using a base layer between the core member 11 and cover member 14.

However, since Examples 1 and 2 included the first adhesive layer 12, which was made of a material with good adhesion properties to the core member 11, and the second adhesive layer 13, which was made of a material with good adhesion properties to the cover member 14, the first adhesive layer 12 and the second adhesive layer 13 both having relatively low bond strength were separated from each other at the interface. Since Comparative Example 1 included neither the first adhesive nor second adhesive, the core member and cover member were separated from each other at the interface. Since Comparative Example 2 did not include the first adhesive layer made of a material with good adhesion properties to the core member, the core member and second adhesive layer were separated from each other at the interface. Since Comparative Examples 3 and 4 did not include the second adhesive layer made of a material with good adhesion properties to the cover member, the first adhesive layer and the cover member were separated from each other at the interface.
[Examples: Epoxy-Resin Cover Member]

Example 3

Firstly, a metallic core member was prepared. The core member was an iron core having an outer diameter of 400 mm and a length of 2400 mm.

Then, the core member 11 was sandblasted to roughen the outer circumferential surface, and a first adhesive layer 12 was formed in contact with the outer surface of the core member 11. The adhesive used as the first adhesive layer 12 was "Chemlok XPJ-60" manufactured by LORD Japan, Inc. This adhesive was a phenol-based adhesive. The first adhesive layer 12 of 100 g/m² was applied on the surface of the core member.

Subsequently, the first adhesive layer 12 was subjected to a baking process. The first adhesive layer 12 was baked at 125° C. for 4 hours.

In addition to the process performed on the core member, a tubular body which will be a cover member was formed. The tubular body was formed by pouring an epoxy resin raw material mixed with silica powder into a predetermined-sized mold designed specifically for the tubular body, curing it at a temperature from 170° C. to 180° C., and machining it to have an outer diameter of 450 mm, an inner diameter of 406 mm, and a length of 2470 mm.

The tubular body as a cover member was put around the core member 11 with the first adhesive layer 12 formed thereon. Then, a second adhesive layer 13 was provided between the first adhesive layer 12 and the tubular body. The second adhesive layer 13 was formed as follows. An epoxy resin-based adhesive was poured into a ring-shaped gap between the core member 11 with the first adhesive layer 12 formed thereon and the tubular body. Then, the adhesive was primarily cured by heating the tubular body from outside and keeping it at 50° C., and secondarily cured by heating it to 80° C. Subsequently, the outer circumferential surface of the roll was cut and ground, thereby completing an epoxy resin roll having a length of 2400 mm and a diameter of 440 mm.

Comparative Example 5

Firstly, a metallic core member was prepared. The core member was an iron core having an outer diameter of 400 mm and a length of 2400 mm.

Then, the core member 11 was sandblasted to roughen the outer circumferential surface, and a base layer of 6 mm in thickness was formed on the outer circumferential surface of the core member 11. The base layer was formed by winding a glass cloth tape impregnated with epoxy resin mixed with silica powder around the core member, and subsequently winding glass roving impregnated with the same epoxy resin as was previously used around the tape layer. The epoxy resin was cured at 110° C.

In addition to the process performed on the core member, a tubular body which will be a cover member was formed. The tubular body was formed by pouring an epoxy resin raw material mixed with silica powder into a predetermined-sized mold designed specifically for the tubular body, curing it at a temperature from 170° C. to 180° C., and machining it to have an outer diameter of 450 mm, an inner diameter of 418 mm, and a length of 2470 mm.

The tubular body as a cover member was put around the core member 11 with the base layer formed thereon. Then, an epoxy resin-based adhesive was poured into a ring-shaped gap between the base layer and the tubular body. Then, the adhesive was primarily cured by heating the tubular body from outside and keeping it at 50° C., and secondarily cured by heating it to 80° C. Subsequently, the outer circumferential surface of the roll was cut and ground, thereby completing an epoxy resin roll with the base layer, having a length of 2400 mm and a diameter of 440 mm.

(Evaluation Method)

The rolls of Example 3 and Comparative Example 5 were evaluated for bond strength by the following method. The cover layer of each roll was ground to a thickness of 1 mm. Consequently, the roll of Example 3 included the core member 11, the first adhesive layer 12 (about 10 µm in thickness) formed on the core member 11, the second adhesive layer 13 (3 mm in thickness) formed on the first adhesive layer 12, and the cover layer (1 mm in thickness) formed on the second adhesive layer 13. The roll of Comparative Example 5 included the core member, the base layer (6 mm in thickness) formed on the core member, the adhesive layer (3 mm in thickness) formed on the base layer, and the cover layer (1 mm in thickness) formed on the adhesive layer.

The test was conducted with a DuPont impact tester (manufactured by YASUDA SEIKI SEISAKUSHO, LTD.). In the tester, an impact head with a tip diameter of 15.85 mm was set on the rolls, and a falling weight was dropped from a predetermined height (the height to the impact head was 400 mm, 500 mm, 600 mm, 700 mm, 800 mm, 900 mm, 1000 mm). The falling weight was 2 kg.

(Evaluation Results)

Regarding Example 3, the falling weight dropped from 800 mm or lower did not cause delamination, but the falling weight dropped from 900 mm or higher caused delamination. The delamination occurred on the first adhesive layer 12 between the core member 11 and the second adhesive 13. Inspection of the delaminated part has revealed that the first adhesive layer had clung to both the core member 11 and the second adhesive layer 13. This probably occurred because of failure in the first adhesive layer.

Regarding Comparative Example 5, on the other hand, the falling weight dropped from 500 mm or lower did not cause delamination, but the falling weight dropped from 600 mm or higher caused delamination. The delamination occurred at the interface between the base layer and the adhesive layer.

Example 3 including the first adhesive layer 12, which was made of a material with good adhesion properties to the core member 11, and the second adhesive layer 13, which was made of a material with good adhesion properties to the cover member 14, possessed higher bond strength than Comparative Example 5 including the base layer and the adhesive layer. In addition, the fact that Example 3, which does not include any base layer, possesses higher bond strength than Comparative Example 5, which includes a base layer, has proved that the present invention can provide a structurally-simple industrial roll having an improved bond strength.

[Examples: Polyurea-Resin Cover Member]

Example 4

The roll of Example 4 was manufactured under the same conditions as Example 3 whose cover member is made of epoxy resin, but the material of the cover member 14 (tubular body as the cover member) was "a polyurea resin raw material mixed with 80 parts by mass of polyamine per 100 parts by mass of isocyanate", instead of "an epoxy resin raw material mixed with silica powder".

A bond strength test was conducted on the roll with the cover member 14 made of polyurea resin by using the DuPont impact tester (manufactured by YASUDA SEIKI SEISAKUSHO, LTD.), which was the same tester as used for Example 3. The test results show that the roll of Example 4, which included the polyurea-resin cover member, had bond strength almost equal to that of the roll of Example 3, which included the epoxy-resin cover member.

The above-described Examples have confirmed that the industrial roll that is structurally simple, but capable of maintaining high bond strength between the core member 11 and cover member 14 can be achieved by providing a core member 11, a first adhesive layer 12 that is formed in contact with the core member 11 and is made of a material with good adhesion properties to the core member 11, a second adhesive layer 13 that is formed in contact with the first adhesive layer 12 and is made of a material with good adhesion properties to the cover member 14, and a cover member 14 that is formed in contact with the second adhesive layer 13.

It should be understood that the embodiment and examples disclosed herein are illustrative and non-restrictive in every respect. The scope of the present invention is defined by the terms of the claims, rather than by the foregoing embodiment and examples, and is intended to include any modifications within the scope and meaning equivalent to the terms of the claims.

REFERENCE SIGNS LIST 10 roll
11 core member
12 first adhesive layer
13 second adhesive layer
14 cover member
21 mold

What is claimed is:

1. A papermaking roll having a diameter of 200 mm to 2,000 mm and a length of 1 m to 15 m, comprising:
a core member comprising a metal and having an outer surface subjected to a surface roughening treatment;
a first adhesive layer formed in contact with the outer surface of the core member, wherein the first adhesive layer comprises a baking treatment surface;
a second adhesive layer formed directly on the baking treatment surface of the first adhesive layer; and
a cover member formed in direct contact with an outer surface of the second adhesive layer, wherein the cover member is an outermost layer of the papermaking roll and comprises a single layer and comprising an elastic material, wherein
the first adhesive layer comprises a material with better adhesion properties to the core member than to the cover member,
the second adhesive layer comprises a material with better adhesion properties to the cover member than to the core member,
wherein no base layer including threads, woven fabric, or non-woven fabric is provided between the core member and the cover member, and
wherein:
i) the metal comprises iron or an alloy of iron, the first adhesive layer comprises a phenol-based adhesive, the elastic material comprises polyurethane and the second adhesive layer comprises a urethane-based adhesive, or
ii) the metal comprises iron or an alloy of iron, the first adhesive layer comprises a phenol-based adhesive, the elastic material comprises an epoxy resin or polyurea resin and the second adhesive layer comprises an epoxy-based adhesive.

2. The papermaking roll according to claim 1, wherein said first adhesive layer further comprises an epoxy-based adhesive.

3. A method of manufacturing a papermaking roll having a diameter of 200 mm to 2,000 mm and a length of 1 m to 15 m, the method comprising steps of:
preparing a core member comprising a metal and having an outer surface subjected to a surface roughening treatment;
forming a first adhesive layer in contact with the outer surface of the core member, wherein the first adhesive layer comprises a baking treatment surface;
forming a second adhesive layer directly on the baking treatment surface of the first adhesive layer; and
forming a cover member in direct contact with an outer surface of the second adhesive layer, wherein the cover member is an outermost layer of the papermaking roll and comprises a single layer and comprising an elastic material, wherein
the first adhesive layer comprises a material with better adhesion properties to the core member than to the cover member,
the second adhesive layer comprises a material with better adhesion properties to the cover member than to the core member,
wherein no base layer including threads, woven fabric, or non-woven fabric is provided between the core member and the cover member, and
wherein:
i) the metal comprises iron or an alloy of iron, the first adhesive layer comprises a phenol-based adhesive, the elastic material comprises polyurethane and the second adhesive layer comprises a urethane-based adhesive, or
ii) the metal comprises iron or an alloy of iron, the first adhesive layer comprises a phenol-based adhesive, the elastic material comprises an epoxy resin or polyurea resin and the second adhesive layer comprises an epoxy-based adhesive.

4. A textile calender roll having a diameter of 200 mm to 2,000 mm and a length of 1 m to 15 m, comprising:
a core member comprising a metal and having an outer surface subjected to a surface roughening treatment;
a first adhesive layer formed in contact with the outer surface of the core member, wherein the first adhesive layer comprises a baking treatment surface;
a second adhesive layer formed directly on the baking treatment surface of the first adhesive layer; and
a cover member formed in direct contact with an outer surface of the second adhesive layer, wherein the cover member is an outermost layer of the textile calendar roll and comprising an elastic material, wherein
the first adhesive layer comprises a material with better adhesion properties to the core member than to the cover member,
the second adhesive layer comprises a material with better adhesion properties to the cover member than to the core member,
wherein no base layer including threads, woven fabric, or non-woven fabric is provided between the core member and the cover member, and
wherein:
i) the metal comprises iron or an alloy of iron, the first adhesive layer comprises a phenol-based adhesive, the elastic material comprises polyurethane and the second adhesive layer comprises a urethane-based adhesive, or
ii) the metal comprises iron or an alloy of iron, the first adhesive layer comprises a phenol-based adhesive, the elastic material comprises an epoxy resin or polyurea resin and the second adhesive layer comprises an epoxy-based adhesive.

5. The textile calender roll according to claim 4, wherein said first adhesive layer further comprises an epoxy-based adhesive.

6. A method of manufacturing a textile calender roll having a diameter of 200 mm to 2,000 mm and a length of 1 m to 15 m, the method comprising steps of:
preparing a core member comprising a metal and having an outer surface subjected to a surface roughening treatment;

forming a first adhesive layer in contact with the outer surface of the core member, wherein the first adhesive layer comprises a baking treatment surface;

forming a second adhesive layer directly on the baking treatment surface of the first adhesive layer; and forming a cover member in direct contact with an outer surface of the second adhesive layer, wherein the cover member is an outermost layer of the textile calendar roll and comprises a single layer and comprising an elastic material, wherein the first adhesive layer comprises a material with better adhesion properties to the core member than to the cover member, the second adhesive layer comprises a material with better adhesion properties to the cover member than to the core member, and wherein:

i) the metal comprises iron or an alloy of iron, the first adhesive layer comprises a phenol-based adhesive, the elastic material comprises polyurethane and the second adhesive layer comprises a urethane-based adhesive, or ii) the metal comprises iron or an alloy of iron, the first adhesive layer comprises a phenol-based adhesive, the elastic material comprises an epoxy resin or polyurea resin and the second adhesive layer comprises an epoxy-based adhesive.

* * * * *